US010001110B2

(12) United States Patent
Rogers (10) Patent No.: US 10,001,110 B2
(45) Date of Patent: Jun. 19, 2018

(54) WIND-DRIVEN ELECTRIC GENERATOR ARRAY

(71) Applicant: Richard Rogers, New Prague, MN (US)

(72) Inventor: Richard Rogers, New Prague, MN (US)

(*) Notice: Subject to any disclaimer, the term of this patent is extended or adjusted under 35 U.S.C. 154(b) by 0 days. days.

(21) Appl. No.: 15/489,712

(22) Filed: Apr. 17, 2017

(65) Prior Publication Data

US 2017/0218922 A1  Aug. 3, 2017

Related U.S. Application Data (63) Continuation-in-part of application No. 14/739,947, filed on Jun. 15, 2015, now Pat. No. 9,647,487, which
(Continued)

(51) Int. Cl.
*F03D 9/00* (2016.01)
*F03D 9/25* (2016.01)
(Continued)

(52) U.S. Cl.
CPC .............. *F03D 9/25* (2016.05); *B60L 8/006* (2013.01); *B60L 11/1803* (2013.01);
(Continued)

(58) Field of Classification Search
CPC ....... Y02E 10/725; Y02E 10/723; F03D 9/002
(Continued)

(56) References Cited

U.S. PATENT DOCUMENTS 3,538,361 A    11/1970  Hilterbrick et al.
3,713,503 A *   1/1973  Haan ................. B60K 16/00
                                                        180/2.2
(Continued)

FOREIGN PATENT DOCUMENTS

WO     2009149769 A2    12/2009

OTHER PUBLICATIONS

International Search Report for Corresponding Application No. PCT/US2011/042466 dated Jul. 27, 2012.
(Continued)

*Primary Examiner* — Vanessa Girardi
(74) *Attorney, Agent, or Firm* — Seager Tufte & Wickhem LLP (57) ABSTRACT

In one illustrative embodiment, a wind-driven charging system includes a wind-driven rotation device coupled to a rotatable shaft, and a plurality of electric generators disposed at different longitudinal locations along the rotatable shaft and each of the plurality of electric generators are rotationally driven simultaneously by the rotatable shaft. By having the electric generators disposed at different longitudinal locations, more electric generators may be simultaneously driven by a common shaft. In some instances, a controller may be configured to enable more of the electric generators to provide electrical current to recharge a battery when the speed of rotation of the rotatable shaft increases, and may disable more of the plurality of electric generators to not provide electrical current when the speed of rotation of the rotatable shaft decreases.

20 Claims, 9 Drawing Sheets

Related U.S. Application Data is a continuation of application No. 12/825,890, filed on Jun. 29, 2010, now Pat. No. 9,059,601.

(51) Int. Cl.
*B60L 8/00* (2006.01)
*B60L 11/18* (2006.01)
*H02J 7/14* (2006.01)
*F03D 9/32* (2016.01)

(52) U.S. Cl.
CPC ............ *B60L 11/1864* (2013.01); *F03D 9/32* (2016.05); *H02J 7/1415* (2013.01); *H02J 7/1423* (2013.01); *B60L 2210/30* (2013.01); *B60L 2240/12* (2013.01); *B60L 2240/421* (2013.01); *F05B 2240/60* (2013.01); *F05B 2240/941* (2013.01); *F05B 2260/4031* (2013.01); *H02J 2007/143* (2013.01); *Y02E 10/721* (2013.01); *Y02E 10/725* (2013.01); *Y02T 10/642* (2013.01); *Y02T 10/7005* (2013.01); *Y02T 10/7061* (2013.01); *Y02T 10/7083* (2013.01); *Y02T 10/7241* (2013.01)

(58) Field of Classification Search
USPC ........................... 290/43, 44, 54, 55; 180/2.2
See application file for complete search history.

(56) References Cited

U.S. PATENT DOCUMENTS

| | | | |
|---|---|---|---|
| 3,876,925 A | 4/1975 | Stoeckert | |
| 4,179,007 A | 12/1979 | Howe | |
| 4,220,870 A * | 9/1980 | Kelly | F03D 13/20 290/44 |
| 4,585,950 A | 4/1986 | Lund | |
| 5,280,827 A | 1/1994 | Taylor et al. | |
| 5,296,746 A | 3/1994 | Burkhardt | |
| 5,631,544 A | 5/1997 | Syverson et al. | |
| 5,863,180 A | 1/1999 | Townsend | |
| 5,917,304 A | 6/1999 | Bird | |
| 5,920,127 A | 7/1999 | Damron et al. | |
| 5,986,429 A | 11/1999 | Mula, Jr. | |
| 6,138,781 A | 10/2000 | Hakala | |
| 6,400,125 B1 | 6/2002 | Pierret et al. | |
| 6,897,575 B1 | 5/2005 | Yu | |
| 7,211,905 B1 | 5/2007 | McDavid, Jr. | |
| 7,434,636 B2 | 10/2008 | Sutherland | |
| 7,445,064 B2 | 11/2008 | Kim | |
| 7,492,053 B2 | 2/2009 | Fein et al. | |
| 7,498,684 B2 | 3/2009 | Fein et al. | |
| 7,675,189 B2 | 3/2010 | Grenier | |
| 7,802,641 B2 | 9/2010 | Friedmann | |
| 7,868,416 B2 | 1/2011 | Tanaka et al. | |
| 7,977,842 B2 | 7/2011 | Lin | |
| 8,067,852 B2 | 11/2011 | Ortiz et al. | |
| 8,220,569 B2 | 7/2012 | Hassan | |
| 8,624,423 B2 * | 1/2014 | Ju | F03D 3/00 290/44 |
| 8,791,596 B2 | 7/2014 | Fein et al. | |
| 9,030,037 B2 * | 5/2015 | Gao | F03D 3/062 290/55 |
| 9,059,601 B2 | 6/2015 | Rogers | |
| 9,647,487 B2 | 5/2017 | Rogers | |
| 2002/0153178 A1 | 10/2002 | Limonius | |
| 2005/0046195 A1 | 3/2005 | Kousoulis | |
| 2005/0280264 A1 | 12/2005 | Nagy | |
| 2006/0210400 A1 | 9/2006 | Hampl | |
| 2006/0273596 A1 | 12/2006 | Durbin | |
| 2007/0107949 A1 | 5/2007 | Bradley et al. | |
| 2007/0202976 A1 * | 8/2007 | Luedtke | B60K 6/48 474/70 |
| 2007/0262584 A1 | 11/2007 | Lu | |
| 2008/0041643 A1 | 2/2008 | Khalife | |
| 2008/0283319 A1 | 11/2008 | Putnam | |
| 2008/0286102 A1 | 11/2008 | Tomoyasu | |
| 2008/0315827 A1 | 12/2008 | Massey | |
| 2010/0001531 A1 | 1/2010 | Kulde | |

OTHER PUBLICATIONS

PA Performance, "High Output Alternators and Starters," 1 page, prior to Jun. 29, 2010.

* cited by examiner

WIND-DRIVEN ELECTRIC GENERATOR ARRAY

RELATED APPLICATIONS

This application is a continuation-in-part of U.S. patent application Ser. No. 14/739,947, filed Jun. 15, 2015, and entitled "WIND-DRIVEN RECHARGER FOR VEHICLE BATTERY", which is a continuation of U.S. patent application Ser. No. 12/825,890, filed Jun. 29, 2010, and entitled "WIND-DRIVEN RECHARGER FOR VEHICLE BATTERY", now U.S. Pat. No. 9,059,601, both of which are incorporated herein by reference.

TECHNICAL FIELD

The disclosure relates generally to electrical charging and recharging devices and systems for vehicles.

BACKGROUND

To extend the driving range and/or efficiency of electric powered vehicles, charging systems have been devised to provide battery charging through wind driven generators as the vehicle is moving. What would be desirable, however, is an improved wind-driven recharging system.

SUMMARY

The disclosure relates generally to electrical charging and recharging devices and systems for vehicles. In one illustrative embodiment, a wind-driven charging system includes a wind-driven rotation device coupled to a rotatable shaft, and a plurality of electric generators disposed at different longitudinal locations along the rotatable shaft and each of the plurality of electric generators are rotationally driven simultaneously by the rotatable shaft. By having the electric generators disposed at different longitudinal locations, more electric generators may be simultaneously driven by a common shaft. In some instances, a controller may be configured to enable more of the electric generators to provide electrical current to recharge a battery when the speed of rotation of the rotatable shaft increases, and may disable more of the plurality of electric generators to not provide electrical current when the speed of rotation of the rotatable shaft decreases.

The above summary of some illustrative embodiments is not intended to describe each disclosed embodiment or every implementation of the present disclosure. The Figures, and Description, which follow, more particularly exemplify some of these embodiments.

BRIEF DESCRIPTION OF THE FIGURES

The disclosure may be more completely understood in consideration of the following description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.718, 3, 3.14159265, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings in which similar elements in different drawings are numbered the same. The drawings, which are not necessarily to scale, depict illustrative embodiments and are not intended to limit the scope of the invention.

The motion of a vehicle produces wind with respect to the vehicle body. Such wind may be harnessed to generate an electrical current that can be used to recharge one or more batteries on the vehicle. In one illustrative embodiment, the wind may be collected by one or more ducts that direct the wind to one or more blades on a turbine, which then rotates the turbine. The turbine, in turn, may be coupled to and rotate a rotatable shaft. In some instances, the rotatable shaft may drive multiple electric generators (e.g. alternators) so that when the rotatable shaft is rotated by the wind, the electric generators all rotate as well. In some instances, the electric generators may be alternators, but this is not required. In some cases, the alternators (or some other circuit) may include suitable rectifiers to convert the alternating current (AC) produced by the alternators to direct current (DC). The direct current from each of the alternators may be optionally collected and combined with each other, and may be directed to one or more batteries to recharge the batteries. In some cases, the direct current (or AC current) may be directed to an electric motor of the vehicle to directly drive the electric motor of the vehicle.

In some illustrative embodiments, the electric generators may be spaced apart longitudinally along the length of the rotatable shaft. In some cases, the electric generators are regularly spaced along the length of the rotatable shaft. In some cases, at least some of the electric generators may arranged collinear along a line parallel to but offset from the rotatable shaft. In some instances, there may be two are more sub-sets of electric generators situated along the rotatable shaft, with each sub-set being collinear along a line parallel to the rotatable shaft but offset from one another. In some cases, one sub-set of electric generators may be axially displaced with respect to another sub-set of electric generators. In other cases, one sub-set of electric generators may be axially coincident with another group of electric generators.

The preceding paragraph is merely meant to be a summary, and should not be construed as limiting in any way. A more detailed description appears in the text that follows and in the figures.

Figure 1:
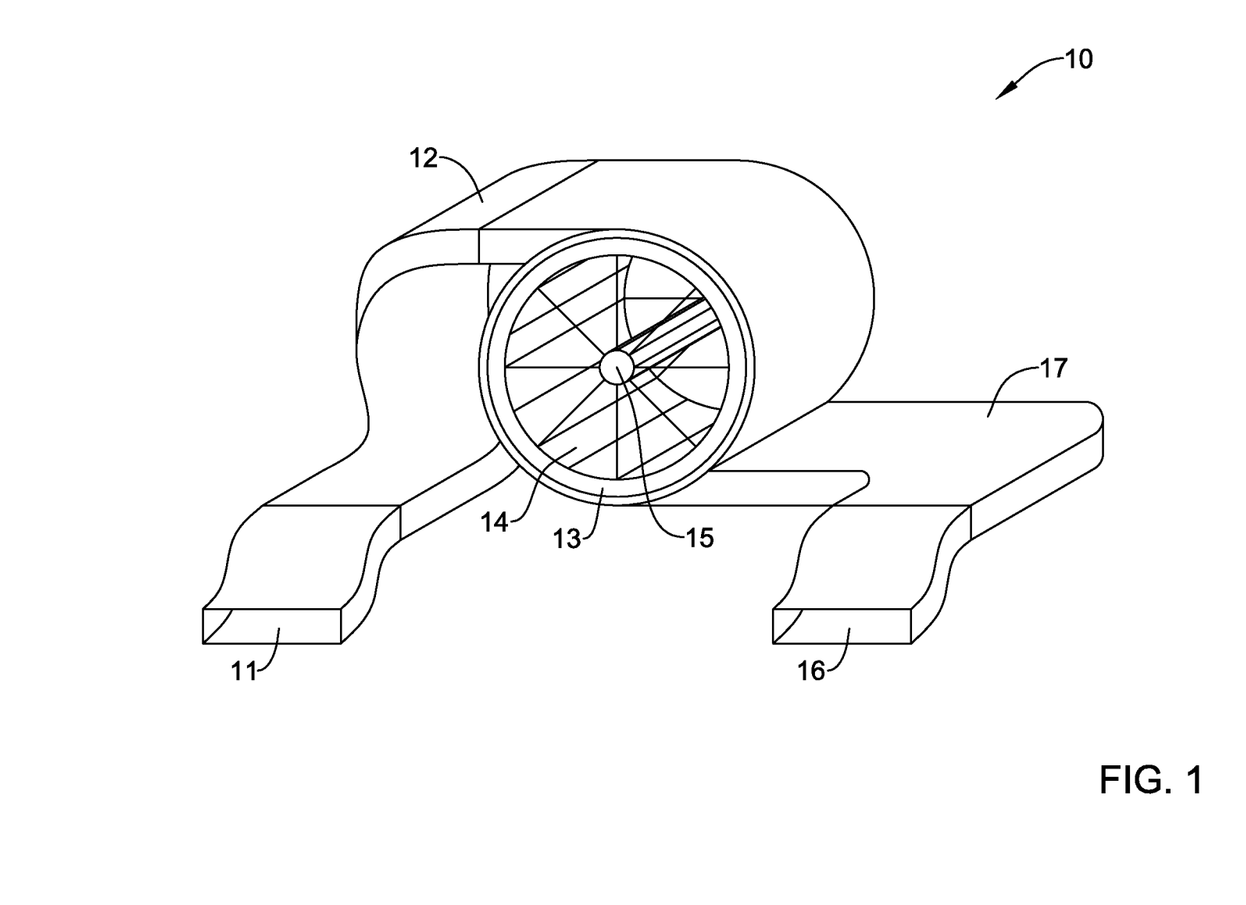
FIG. 1 is a perspective view showing an illustrative wind-driven rotation device.

FIG. 1 is a perspective view showing an illustrative wind-driven rotation device 10. In the illustrative wind-driven rotation device 10, an opening or vent 11 is pointed toward the front of the vehicle. Wind from the vehicle's motion enters the vent 11. The vent 11 may be located behind or under the grill of the vehicle, may be on the top or along the sides of the vehicle, or may protrude through a hood of the vehicle. These are just some examples. Regardless of location, the vent 11 may capture a portion of the motion-generated wind.

Wind entering the vent 11 is directed by a suitable duct 12 into a turbine rotor 13. The air flow entering the rotor 13 may do so tangentially as shown. The incoming air strikes the blades 14 of the rotor 13 and causes the rotor 13 to rotate about its center line 15. In the illustrative design shown in FIG. 1, the air flow enters the rotor 13 at the top, traveling to the right, and causes the rotor 13 to turn clockwise. The blades 14 of the rotor may be inclined toward the incoming air, may be radial, or may be inclined away from the incoming air. The blades may be flat, or may optionally be curved toward or away from the incoming air. The illustrative design of FIG. 1 also includes a second vent 16 and second duct 17 that direct additional motion generated wind into the rotor 13, tangentially along the bottom edge of the rotor 13. Optionally, more than two vents and ducts may be used, as desired.

It is contemplated that the vents 11 and 16, and ducts 12 and 17, may be any suitable shape or take on any suitable configuration. For example, the vents 11 and 16, and/or ducts 12 and 17, may be rectangular, square, round, oval or any other suitable shape as desired. In some instances, the vents 11 and 16 and/or ducts 12 and 17 may take the form of a cone or other shaped spiral, which helps orient the incoming air into a vortex which may help increase the force applied to the blades 14 of the rotor 13.

In the illustrative embodiment, the air flow that enters the rotor 13 through the ducts 12 and 17 exits the rotor 13 through the front and/or rear openings. In the illustrative design shown in FIG. 1, the front and rear openings of the rotor face the viewer and face away from the viewer, respectively. In some cases, the rotor 13 design shown in FIG. 1 may be referred to as a "hamster wheel" or "squirrel cage" design. While a "hamster wheel" or "squirrel cage" design is shown in FIG. 1, it is contemplated that the wind-driven rotation device 10 may be of any suitable design. In some cases, the wind-driven rotation device 10 may optionally include one or more propellers and/or spiral propellers. In general, any suitable design for converting incoming wind energy into rotation of a rotatable shaft 24 may be used, as desired.

Figure 2:
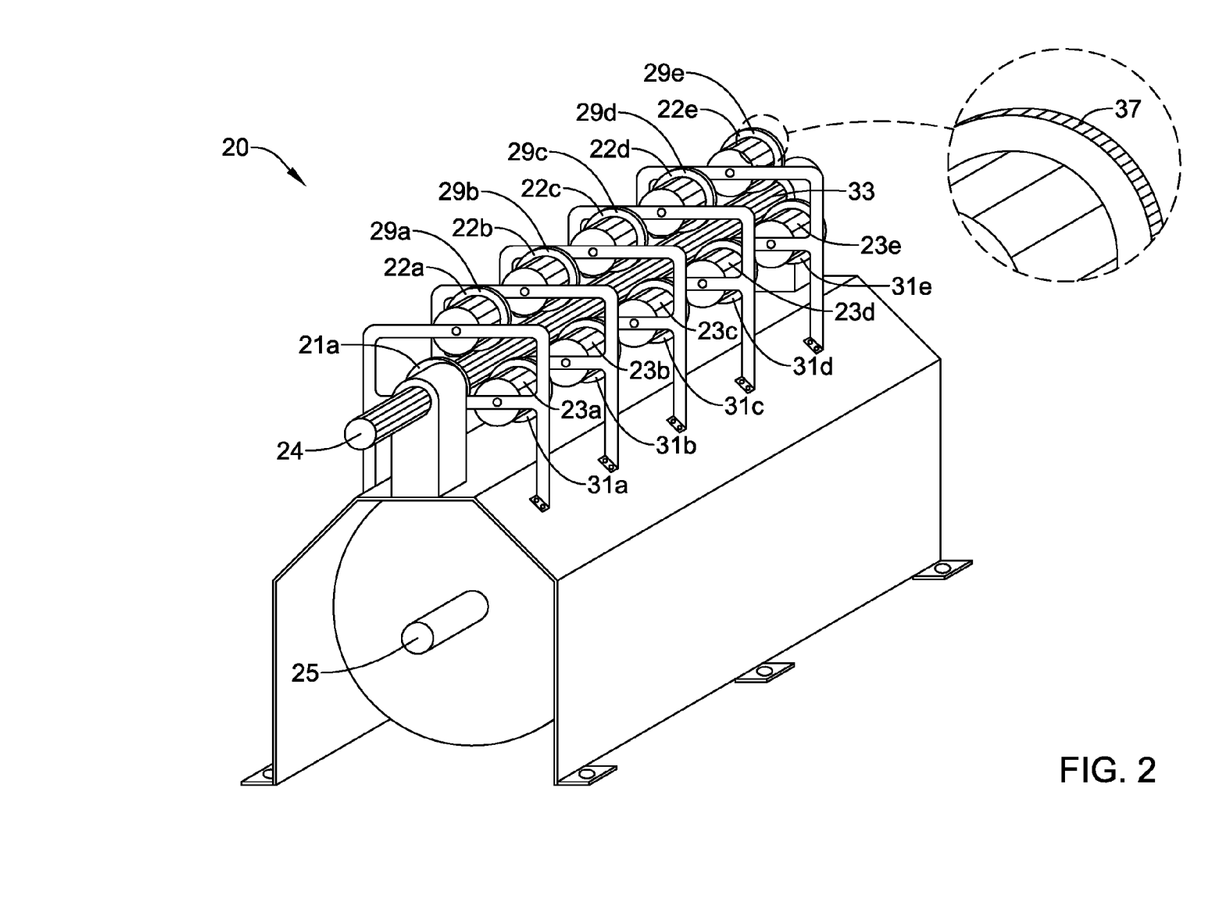
FIG. 2 is a perspective view of an illustrative frame design that can support a rotatable shaft and a plurality of electric generators.

Turning now to FIG. 2, which shows a perspective view of a frame that can support a rotatable shaft 24 and a plurality of electric generators 21A, 22A-E and 23A-E. In the illustrative embodiment, the frame 20 supports a rotatable shaft 24, on which the wind-driven rotation device 10 of FIG. 1 may drive. In one illustrative embodiment, the rotatable shaft 24 may be collinear with the center line 15 of the wind-driven rotation device 10 of FIG. 1, so that when the turbine rotor 13 rotates, the rotatable shaft 24 also rotates. Such a direct coupling has a 1:1 correspondence between the rotation rate of the turbine rotor 13 and the rotatable shaft 24. However, it is contemplated that the wind-driven rotation device 10 may be mounted such that the rotation of the turbine rotor 13 may be coupled to the rotatable shaft 24 with a different correspondence between the rotation rate of the turbine rotor 13 and the rotatable shaft 24. For example, the wind-driven rotation device 10 may be mounted such that the turbine rotor 13 is coupled to the rotatable shaft 24 by one or more belts and/or gears, which in some cases, may provide a 2:1, 3:1 or any other suitable ratio. It is contemplated that the rotation rates of the rotor 13 relative to the rotatable shaft 24 may be scaled up or down by using appropriate belting and/or gear sizes of an appropriate ratio, as desired.

The rotatable shaft 24 itself may be ridged to accommodate gears, or may be knurled, roughened or may include serrations (e.g. grooved or splined) to reduce slippage with belts, wheels or other components that may engage the rotatable shaft 24. Optionally, ridges, knurls or serrations may extend over certain portions of the rotatable shaft 24. As a further option, one or more portions of the rotatable shaft 24 may be knurled, and one or more other portions of the rotatable shaft 24 may be ridged or may include serrations. These are just some examples.

Each electric generator may be driven be the rotatable shaft 24, so that when the rotatable shaft 24 is turned by the wind-driven rotation device 10, each electric generator is turned as well. In some cases, each electric generator may be coupled to the rotatable shaft 24 through, for example: (1) a belt wrapped around the rotatable shaft 24 and an exterior circumference of a pulley mounted to the input shaft of the electric generator; (2) a gear mounted to the input shaft of the electric generator that engages corresponding ridges or teeth formed in the rotatable shaft; (3) a friction fit between an exterior circumference of a wheel mounted to the input shaft of the electric generator and an outer circumferential surface of the rotatable shaft. For (3), it is contemplated that the outer circumferential surface of the rotatable shaft 24 may include serrations to help reduce slippage between the wheels of the electric generators and the outer circumferential surface of the rotatable shaft 24. It must be recognized that these are just a few examples. It is contemplated that any suitable coupling may be used between the electric generators and the rotatable shaft 24.

The illustrative frame design shown in FIG. 2 includes three rows of electric generators (e.g. alternators) that are all driven by the rotatable shaft 24. In other embodiments, one, two, or more than three sets or sub-sets of electric generators may be used, as desired. In the illustrative embodiment, each row of electric generators, 21A (21B-E not being visible in this view), 22A-E and 23A-E, is mounted so that the corresponding electric generators are collinear or are nearly collinear along a line that is parallel or is nearly parallel to the rotatable shaft 24. Here, the term "nearly" is intended to accommodate typical manufacturing and assembly tolerances. For instance, a replacement part may be sized differently, and may extend farther in a particular direction than the part it replaces. Or, a part may be fastened to a hole adjacent to the hole intended for its mounting. In all of these cases, the electric generators may be said to be collinear or nearly collinear.

The illustrative frame design shown in FIG. 2 shows five electric generators in each row. Alternatively, one, two, at least two, three, at least three, four, at least four, at least five, six, or more than six electric generators may be used in each row, as desired. The number of electric generators in each row may be increased as needed, by lengthening the rotatable shaft 24 and the frame 20, as necessary. In general, a large number of electric generators may be used, because the combined output recharge current of relatively many electric generators may, in some cases, be greater than that of relatively fewer electric generators or of a single electric generator.

The illustrative frame 20 is shown mounted to an electric motor. The electric motor may be used to propel the vehicle under battery power. The illustrative electric motor includes an output shaft 25, which may be coupled to a vehicle drive system (not shown).

Figure 3:
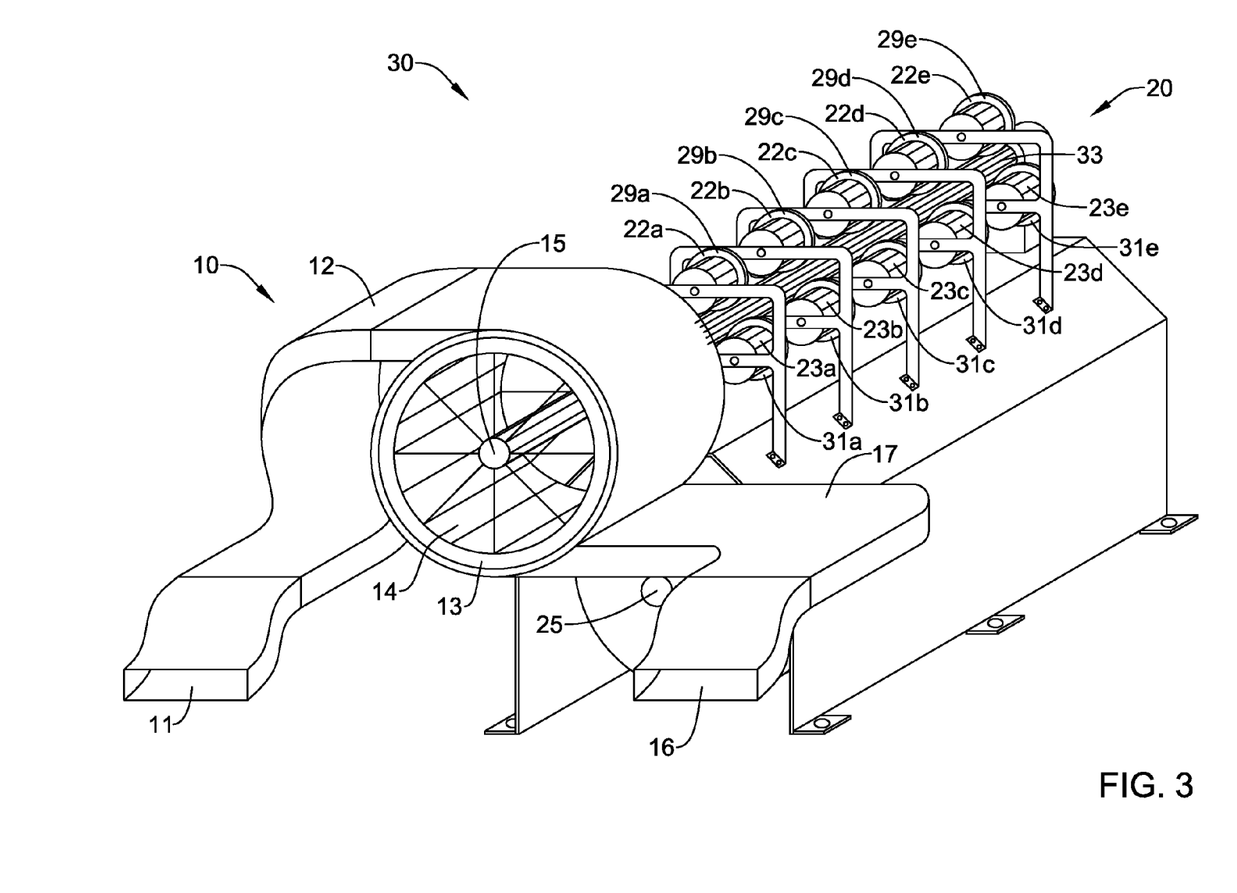
FIG. 3 is a plan drawing of the wind-driven rotation device of FIG. 1 installed with the frame of FIG. 2.

FIG. 3 is a plan drawing of the wind-driven rotation device of FIG. 1 installed with the frame of FIG. 2. Combined, the wind-driven rotation device 10 and the frame 20 form a wind-driven recharging system 30. In the illustrative design shown in FIG. 3, the turbine rotor 13 is directly connected to the rotatable shaft 24, without any intermediate elements. For this illustrative design, the wind-driven rotation device 10 directly rotates the rotatable shaft 24. In this design, the wind-drive rotation device 10 is collinear with the rotatable shaft 24, however, this is not required. More specifically, for this illustrative design, the rotatable shaft 24 is collinear with the center line 15 of the turbine rotor 13. In other designs, the wind-driven rotation device 10 may be rotationally coupled to a belt and/or one or more gears that converts its rotational movement to rotation of the rotatable shaft 24. Using a belt and/or one or more gears may optionally allow a scaling up or scaling down of the relative rotation rates, so that a particular rotation of the turbine rotor 13 may produce more or less rotation of the rotatable shaft 24.

Figure 4:
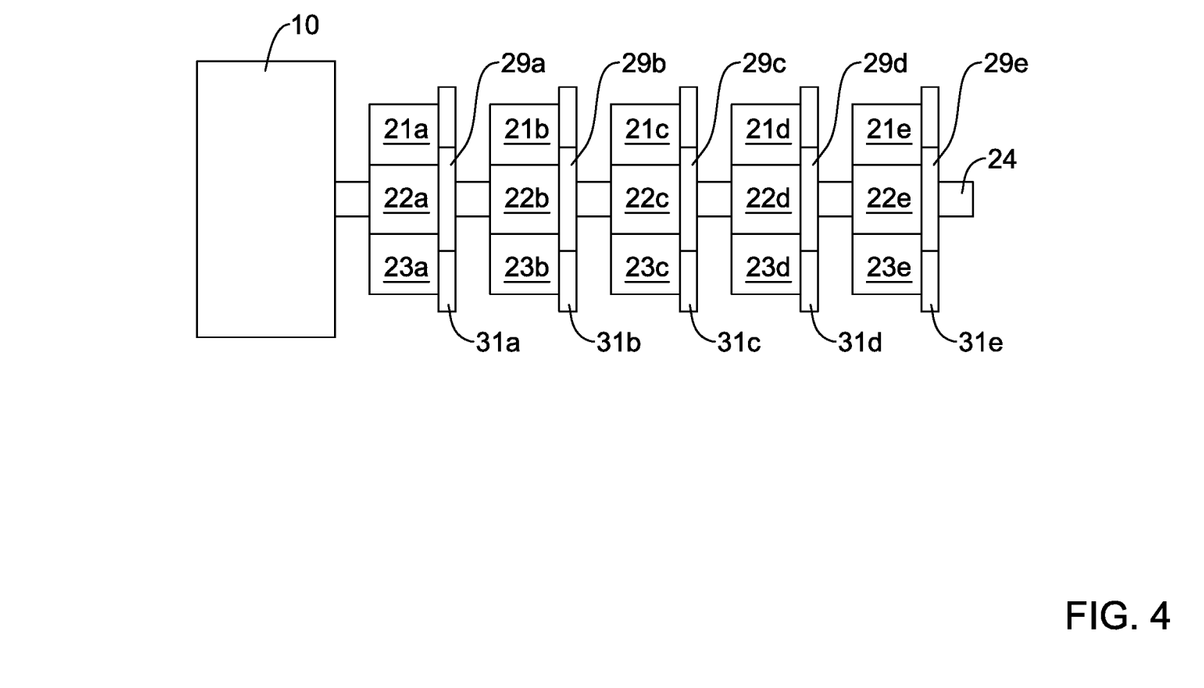
FIG. 4 is a schematic top view of the embodiment shown in FIG. 3.

FIG. 4 is a schematic top view of the embodiment shown in FIG. 3 showing electric generators 21A-E, 22A-E and 23A-E and rotatable shaft 24. In the illustrative embodiment, the electric generators extend over substantially the entire longitudinal length of the rotatable shaft 24, from a proximal end proximate the wind-driven rotation device 10 to a distal end opposite the proximal end. In the illustrative design of FIG. 4, each group of electric generators, 21A-E, 22A-E or 23A-E, is shown regularly spaced along the rotatable shaft 24. Alternatively, the spacing between adjacent electric generators may vary.

Note that each group of electric generators is azimuthally displaced from the other groups. In other words, looking end-on from the point of view of the wind-driven rotation device 10, the groups of electric generators are "spaced out" around the circumference of the rotatable shaft 24. For some designs having two groups of electric generators, the electric generators may be on opposite sides of the rotatable shaft 24. In general, any suitable azimuthal angle may be used, as long as there is room for the electric generators to operate and, in some cases, room to access, repair or replace the electric generators.

In the illustrative design shown in FIG. 4, the two electric generator groups (or subsets) 21A-E and 23A-E are axially coincident. In other words, looking down on the rotatable shaft 24, as in the view of FIG. 4, each electric generator in the group 21A-E couples to the rotatable shaft 24 at the same longitudinal location as the corresponding electric generator in the group 23A-E. Also, in the illustrative design of FIG. 4, the two electric generator groups 21A-E and 22A-E are axially offset from each other. In other words, each electric generator in the group 21A-E couples to the rotatable shaft 24 at a longitudinal location offset from that of the corresponding electric generator in the group 22A-E. Similarly, electric generator groups 23A-E and 22A-E are shown axially offset from each other. In some cases, the axial offsets are the same for all electric generators in the respective groups, but this is not required.

In the illustrative design of FIG. 4, each electric generator group 21A-E, 22A-E and 23A-E is collinear with a line that is parallel to the rotatable shaft 24. Alternatively, the locations of some or all of the electric generators in any group may deviate from a line parallel to the rotatable shaft 24. For instance, the electric generators in a particular group may be staggered about a line, if desired.

Figure 5:
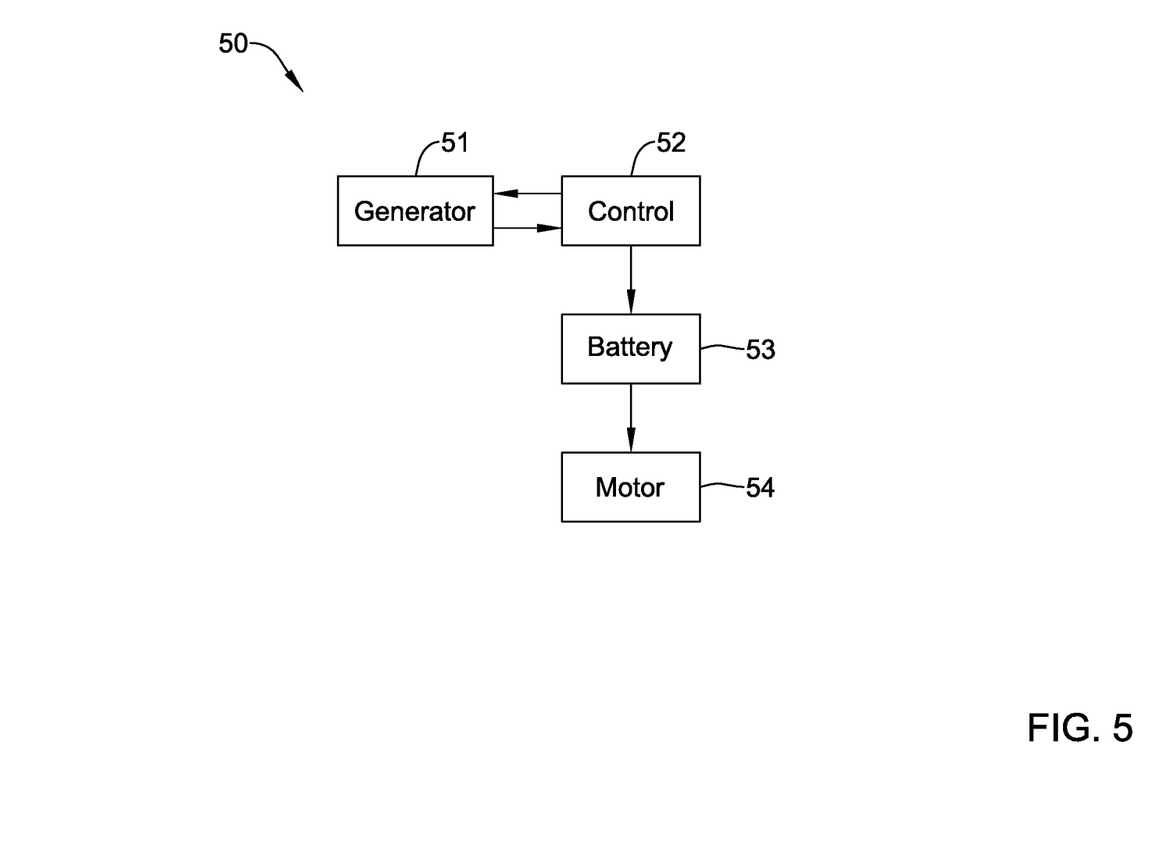
FIG. 5 is a simplified schematic diagram of an illustrative recharging system.

FIG. 5 is a simplified schematic diagram of an illustrative recharging system. The illustrative recharging system 50 includes an electric generator subassembly 51, which is in two-way communication with a controller 52. The controller 52 directs current from the electric generator subassembly 51 to a battery 53, for recharging the battery 53. The battery 53 provides current to an electric motor 54 for propelling the vehicle. In some cases, the battery 53 may provide current for starting a combustion motor, for powering electrical devices in the vehicle such as lights or air conditioning, and/or for directly powering the vehicle, such as for a hybrid vehicle under low-load conditions during which a conventional combustion motor is powered off.

Figure 6:
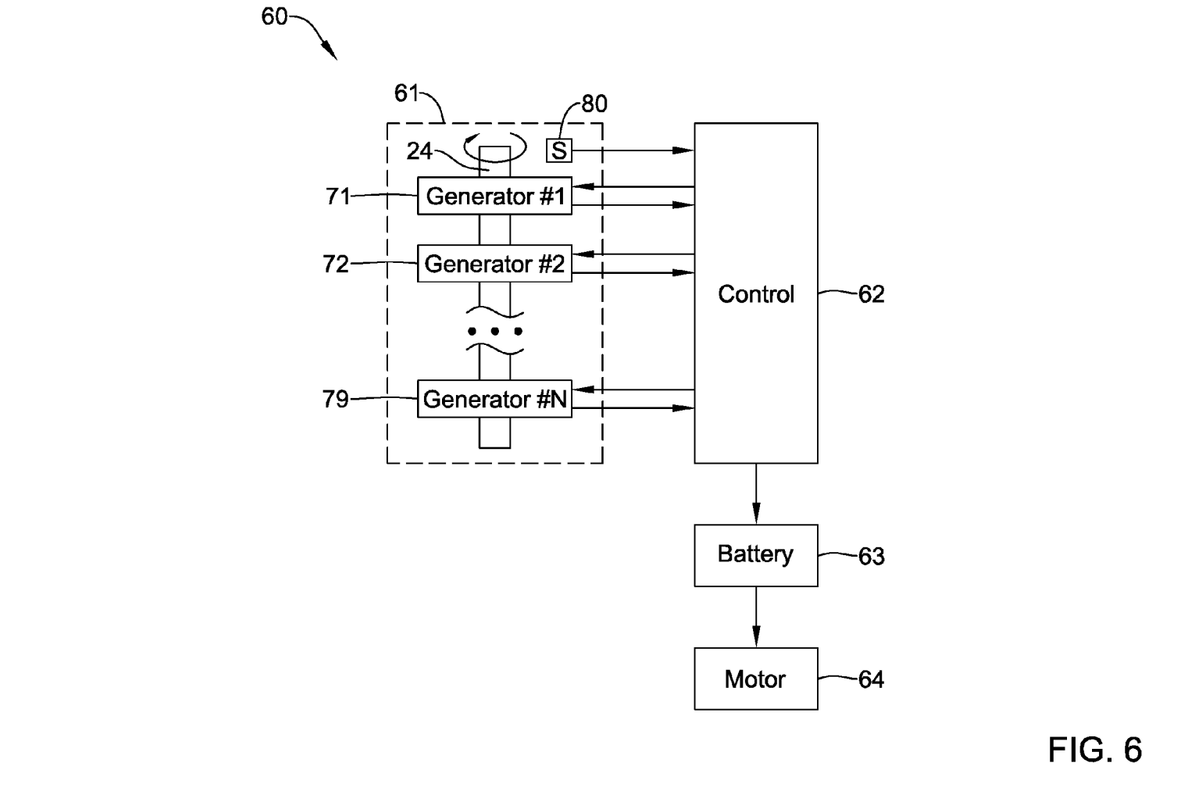
FIG. 6 is a simplified schematic diagram of another illustrative recharging system.

FIG. 6 is a simplified schematic diagram of another illustrative recharging system. In this illustrative embodiment, the recharging system is generally shown at 60 and includes an electric generator subassembly 61, which is in two-way communication with a controller 62. The electric generator subassembly 61 includes a number of electric generators 71, 72, . . . , 79, where electric generator 79 is the "nth" electric generator, where "n" is an integer greater than zero. The "n" electric generator 71, 72, . . . , 79, are all driven by the same rotatable shaft 24, so that they all rotate simultaneously and in synchronization with each other.

The illustrative electric generator subassembly 61 includes a synchronization signal 80, which produces a pulse each time the rotatable shaft 24 rotates past a certain azimuthal location, or produces another suitable electronic marker to denote a particular phase of rotation. For instance, suitable electronic signals may be produced by one or more Hall effect sensors that are adjacent to the rotatable shaft, are connected to the shaft, or rotate along with the rotatable shaft 24. This is just one example sensor. It is contemplated that an optical, magnet or any other type of suitable sensor may be used, as desired, to detect the position and/or rotation speed of the rotatable shaft 24.

The synchronization signal 80 is shown passed to the controller 62, which monitors the synchronization signal 80. The controller 62 can determine, for example, a rotational speed of the rotatable shaft 24 from the number of pulses per unit of time. Alternatively, the rotational speed of the rotatable shaft may be determined as an inverse of the time between adjacent pulses.

In some cases, the controller 62 may determine how much of the electric generator-generated current to pass on to the battery 53. In some cases, the controller 62 may be in two-way communication with the battery 63. For instance, the controller 62 can monitor the load on the battery 63, the voltage produced by the battery 63, and/or the current produced by the battery 63. From one or more of these monitored quantities, the controller 62 may determine when recharging is needed, and may suitably direct current produced by the electric generators 71, 72, . . . , 79 to the battery 63.

In some cases, the controller 62 may limit the amount of current flowing to the battery 63 by dynamically electrically disengaging one or more electric generators 71, 72, . . . , 79 from the output to the battery 63. For instance, if the battery 63 is deemed by the controller 62 to be nearly fully charged, and requires only 20% of the available current from the electric generator subassembly 61 to recharge, the controller may electrically engage only one out of five available electric generators 71, 72, . . . , 79, while keeping the other four in an open circuit thus reducing the load on the rotatable shaft 24. In some cases, such electrical engagement and disengagement may be performed dynamically by the controller 62 as needed.

In some cases, the wind energy may not be sufficient to drive all of the electric generators 71, 72, . . . , 79. For example, when the vehicle is not moving very fast, the wind energy collected by the wind-driven rotation device 10 (see FIG. 1) may only be sufficient to drive one or two of the electric generators 71, 72, . . . , 79. To accommodate this, it is contemplated that the controller 62 may ascertaining a rotation speed of the rotatable shaft 24, and then enable more of the electric generators 71, 72, . . . , 79 to provide electrical recharge current as the speed of rotation of the rotatable shaft 24 increases, and disable more of the plurality of electric generators 71, 72, . . . , 79 to not provide electrical recharge current as the speed of rotation of the rotatable shaft 24 decreases. In some instances, a sufficient number of electric generators 71, 72, . . . , 79 are enabled by the controller 62 to produce a desired, optional or set rotation speed of the rotatable shaft 24.

As previously discussed, FIG. 2 shows a frame 20 that is configured to support the rotatable shaft 24 and a plurality of electric generators 21A, 22A-E and 23A-E that are arranged about the rotatable shaft 24. In some cases, the plurality of electric generators 21A, 22A-E and 23A-E may be arranged in a triangular configuration about a rotatable shaft 24, as shown for example in FIG. 2. In some cases, as will be illustrated in FIGS. 7 and 9, a more planar configuration may be used. The frame designs shown in FIGS. 7 and 9 may, for example, be used in combination with the wind-driven rotation device 10 of FIG. 1.

Figure 7:
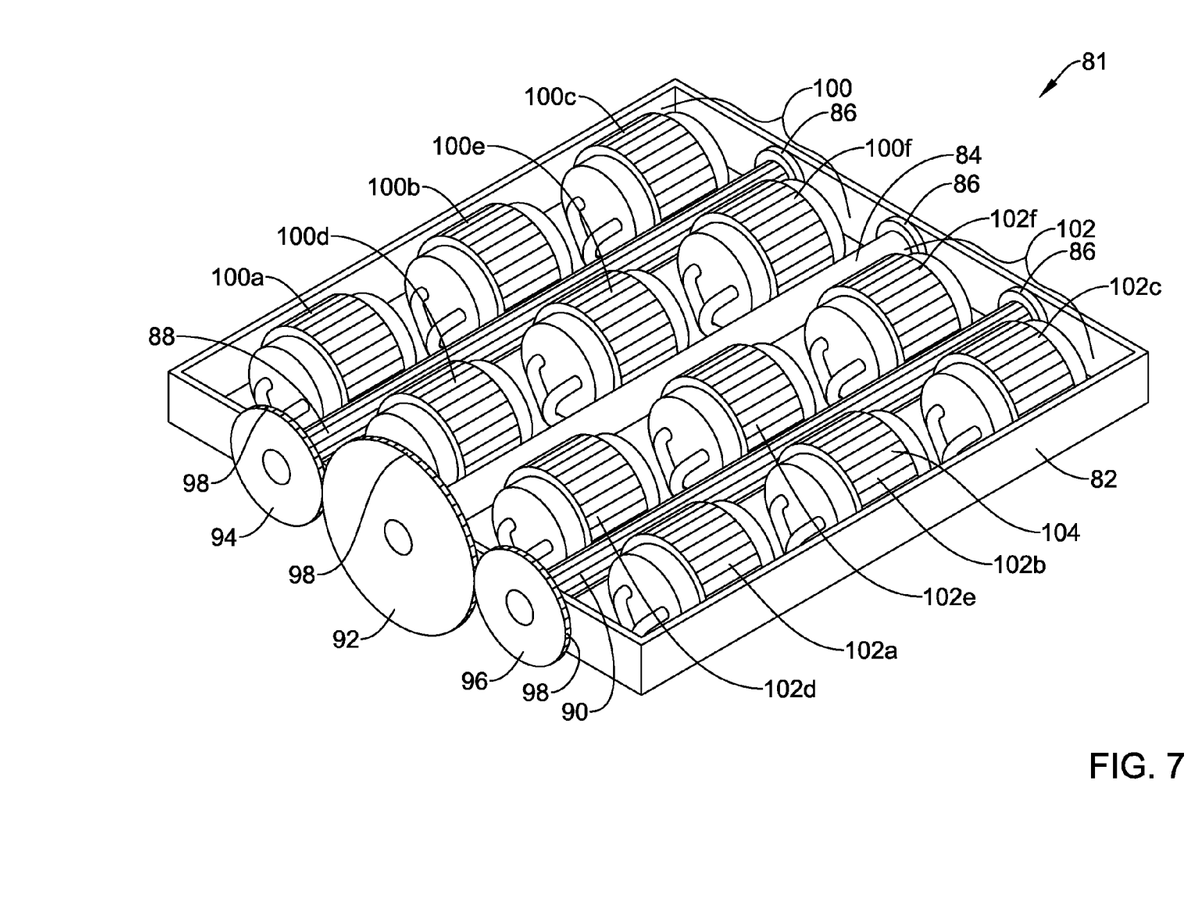
FIG. 7 is a perspective view of an illustrative frame design usable in a wind-driven charging system.

Turning to FIG. 7, and in the example shown, a frame 81 may include a support structure 82. While the support structure 82 is illustrated as being a simple rectilinear structure suitable for supporting the components attached thereto, in some cases the support structure 82 may include additional support elements, such as but not limited to a top element or a bottom element. In the example shown, the frame 81 supports a primary drive shaft 84. In some cases, as illustrated in FIG. 7, the primary drive shaft 84 does not directly engage any electrical generators, and thus may not include a splined outer surface. The primary drive shaft 84 is supported within the frame 81 by carrier bearings 86 at either end of the primary drive shaft 84 (only visible at one end in this view). In some cases, as shown, the frame 81 may support a first drive shaft 88 and a second drive shaft 90, each of which are supported at either end by carrier bearings 86 (only visible at one end in this view).

In the example shown, the primary drive shaft 84 is operably coupled to a primary drive gear 92. The primary drive shaft 84 and/or the primary drive gear 92 may be operably coupled to the wind-driven rotation device 10 such that there is a 1:1 correspondence between a rotation rate of the turbine rotor 13 (FIG. 1) and a rotation rate of the primary drive shaft 84 and the primary drive gear 92. In some cases, however, it is contemplated that the wind-driven rotation device 10 may be mounted such that the rotation of the turbine rotor 13 may be coupled to the rotatable shaft 24 with a different correspondence between the rotation rate of the turbine rotor 13 and the primary drive shaft 84. For example, the wind-driven rotation device 10 may be mounted such that the turbine rotor 13 is coupled to the primary drive shaft 84 by one or more belts and/or gears, which in some cases, may provide a 2:1, 3:1 or any other suitable step-up or step-down ratio. It is contemplated that the rotation rates of the rotor 13 relative to the primary drive shaft 84 may be scaled up or down by using appropriate belting and/or gear sizes of an appropriate ratio, as desired.

The first drive shaft 88 is operably coupled to a first drive gear 94 and the second drive shaft 90 is operably coupled to a second drive gear 96. In some cases, as shown, the primary drive gear 92 may be larger in diameter than either the first drive gear 94 or the second drive gear 96. It will be appreciated that by varying the relative size of the primary drive gear 92 relative to the first drive gear 94 and/or the second drive gear 96, a rotation rate of the first drive shaft 88 and/or the second drive shaft 90 may be varied relative to a rotation rate of the primary drive shaft 84. Thus, this provides another opportunity to adjust rotation rates of the electric generators (as will be discussed) relative to a rotation rate of the turbine motor 13 (FIG. 1).

As illustrated, the primary drive gear 92, the first drive gear 94 and the second drive gear 96 may each include gear teeth 98 such that as the primary drive gear 92 rotates, the first drive gear 94 and the second drive gear 96 are both driven into rotation at rates proportional to a difference in a diameter of the primary drive gear 92 and a diameter of the first drive gear 94 and/or a diameter of the second drive gear 96. Alternatively, in some cases, the first drive gear 94 and/or the second drive gear 96 may be wheels instead of gears, and the primary drive gear 92 may include serrations that the wheels ride upon. In another example, the first drive gear 94 and the second drive gear 96 may be pulleys, and the primary drive pulley may drive the first and second drive pulleys via one or more belts. Using belts to drive the first drive pulley 94 and/or the second drive pulley 96 may enable, with the use of an adjustable tensioning device (not illustrated), to selectively engage or disengage the first drive shaft 88 and/or the second drive shaft 90, and thus selectively engage or disengage the corresponding electric generators driven by the first drive shaft 88 and/or the second drive shaft 90.

As illustrated, the illustrative frame 81 supports a first plurality 100 of electric generators that are disposed on either side of the first drive shaft 88 and a second plurality 102 of electric generators that are disposed on either side of the second drive shaft 90. Accordingly, each of the electric generators in the first plurality 100 of electric generators are driven into rotation by the first drive shaft 88 and each of the electric generators in the second plurality 102 of electric generators are driven into rotation by the second drive shaft 90.

In particular, the first plurality 100 of electric generators includes electric generators 100A, 100B and 100C on a first side of the first drive shaft 88 and electric generators 100D, 100E and 100F on a second side of the first drive shaft 88. Similarly, the second plurality 102 of electric generators includes electric generators 102A, 102B and 102C on a first side of the second drive shaft 90 and electric generators 102D, 102E and 102F on a second side of the second drive shaft 90. While three electric generators are illustrated on each side of each of the drive shafts 88, 90, it will be appreciated that in some cases, there may be only one or two electric generators, or there may be four, five or even more generators on each side of each of the drive shafts 88, 90.

While the drive shafts 88, 90 are illustrated as being coplanar with the primary drive shaft 84, in some cases, one or more of the drive shafts 88, 90 may be positioned above or below a plane extending through the primary drive shaft 84. In some cases, there may be additional drive shafts, coupled to additional drive gears, that are positioned above or below the aforementioned plane. In some cases, this may provide space for additional electric generators when desired. In some cases, some or all of the electric generators 100A, 100B, 100C, 100D, 100E, 100F, 102A, 102B, 102C, 102D, 102E and 102F, and any other electric generators present, may be electrical alternators, for example.

Each electric generator may be driven by a rotating shaft so that when the corresponding drive shaft is rotated, directly or indirectly by the wind-driven rotation device 10, each electric generator is turned as well. In some cases, each electric generator may be coupled to a rotating drive shaft through, for example: (1) a belt wrapped around the drive shaft and an exterior circumference of a pulley mounted to the input shaft of the electric generator; (2) a gear mounted to the input shaft of the electric generator that engages corresponding ridges or teeth formed in the drive shaft; (3) a friction fit between an exterior circumference of a wheel mounted to the input shaft of the electric generator and an outer circumferential surface of the rotatable shaft.

In some cases, as illustrated, each of the electric generators include a raised wheel portion 104 that stands above the rest of the electric generator, and is able to engage a corresponding drive shaft. In some cases, the raised wheel portion 104 is splined or otherwise configured to rotatably engage a splined or serrated surface on the corresponding drive shaft. In some instances, each of the electric generators may instead include a raised wheel such as the raised wheels 29 shown in FIG. 1.

In the illustrative embodiment, each row of electric generators are mounted so that the corresponding electric generators are collinear or are nearly collinear along a line that is parallel or is nearly parallel to the corresponding drive shaft. Here, the term "nearly" is intended to accommodate typical manufacturing and assembly tolerances. For instance, a replacement part may be sized differently, and may extend farther in a particular direction than the part it replaces. Or, a part may be fastened to a hole adjacent to the hole intended for its mounting. In all of these cases, the electric generators may be said to be collinear or nearly collinear.

Figure 8:
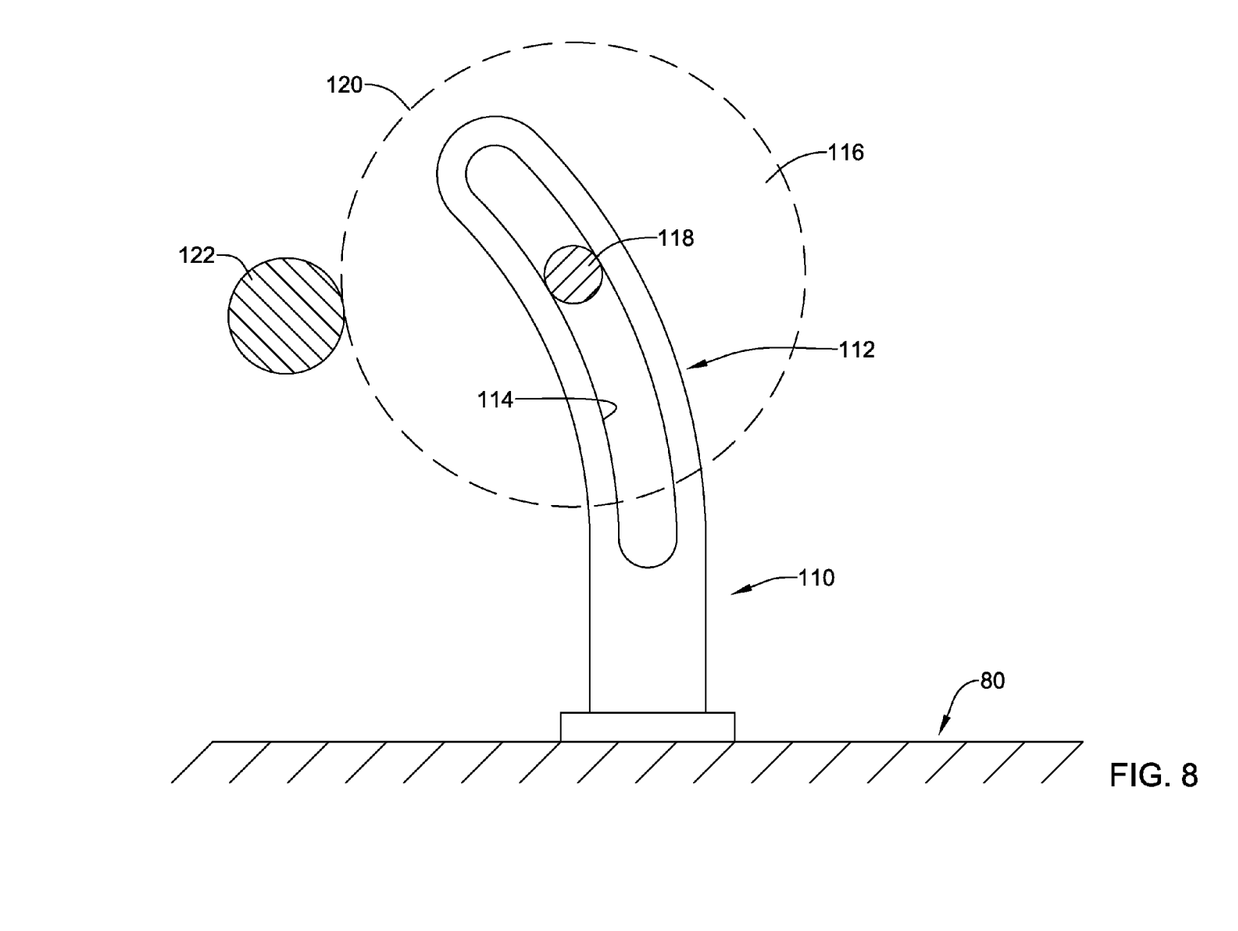
FIG. 8 is a perspective view of an illustrative mounting system usable in the frame design of FIG. 7.

FIG. 8 provides an illustrative but non-limiting example of a way of mounting the individual electric generators within the frame 81. In FIG. 8, a mounting bracket 110 having a curved portion 112 and a curved slot 114 formed within the curved portion 112 is shown secured to a portion of the frame 81. An electric generator 116 having a mounting position 118 can be seen positioned relative to the mounting bracket 110 such that the mounting position 118 aligns with the curved slot 114. An outer periphery 120, which may be defined for example by whichever portion of the electric generator 116 extends outwardly as the drive wheel portion, engages a surface of a drive shaft 122. The relative tension between the electric generator 116 and the drive shaft 122 may be adjusted, for example, by moving the electric generator 116 relative to the drive shaft 122. In some cases, the relative shape of the curved portion 112 and/or the curved slot 114 may be adjusted to accommodate differences in dimensions of either the electric generator 116 or the drive shaft 122. Once at a desired position, the position of the electric generator 116 may be fixed, such as by tightening a bolt of the electric generator 11 that passes through the slot 114 and engages the mounting bracket 110.

Figure 9:
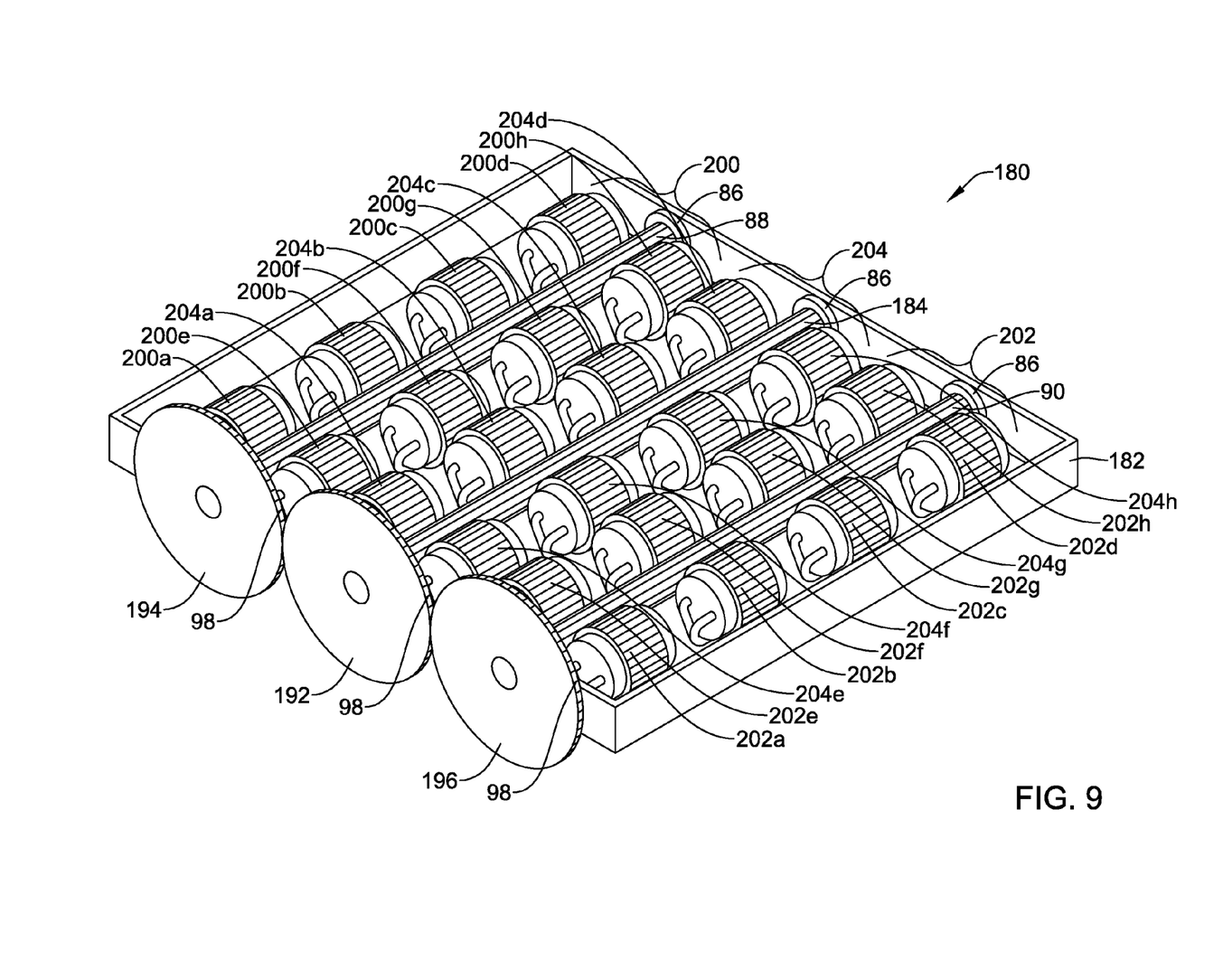
FIG. 9 is a perspective view of an illustrative frame design usable in a wind-driven charging system.

FIG. 9 shows another illustrative frame 180 that includes a support structure 182. While the support structure 182 is illustrated as being a simple rectilinear structure suitable to support the components attached thereto, in some cases the support structure 182 may further include additional support elements, such as but not limited to a top element or a bottom element. The frame 180 supports a primary drive shaft 184. The primary drive shaft 184 is supported within the frame 180 by carrier bearings 86 at either end of the primary drive shaft 184 (only visible at one end in this view). In some cases, as shown, the frame 180 supports a first drive shaft 188 and a second drive shaft 190, each of which are supported at either end by carrier bearings 86 (only visible at one end in this view).

The primary drive shaft 184 is operably coupled to a primary drive gear 192. The primary drive shaft 184 and/or the primary drive gear 192 may be operably coupled to the wind-driven rotation device 10 such that there is a 1:1 correspondence between a rotation rate of the turbine rotor 13 (FIG. 1) and a rotation rate of the primary drive shaft 184 and the primary drive gear 192. In some cases, however, it is contemplated that the wind-driven rotation device 10 may be mounted such that the rotation of the turbine rotor 13 may be coupled to the primary drive shaft 184 with a different correspondence between the rotation rate of the turbine rotor 13 and the primary drive shaft 184. For example, the wind-driven rotation device 10 may be mounted such that the turbine rotor 13 is coupled to the primary drive shaft 184 by one or more belts and/or gears, which in some cases, may provide a 2:1, 3:1 or any other suitable ratio. It is contemplated that the rotation rates of the rotor 13 relative to the primary drive shaft 184 may be stepped-up or stepped-down by using appropriate belting and/or gear sizes of an appropriate ratio, as desired.

In the example shown, the first drive shaft 188 is operably coupled to a first drive gear 194 and the second drive shaft 190 is operably coupled to a second drive gear 196. In some cases, as shown, the primary drive gear 192 may be equal in diameter to the first drive gear 194 or the second drive gear 196. In some cases, the relative sizes of the drive gears 192, 194, 196 may be varied to provide another opportunity to adjust rotation rates of the electric generators (as will be discussed) relative to a rotation rate of the turbine motor 13 (FIG. 1).

As illustrated, the primary drive gear 192, the first drive gear 194 and the second drive gear 196 may each include gear teeth 98 such that as the primary drive gear 192 rotates, the first drive gear 194 and the second drive gear 196 are both driven into rotation at rates proportional to a difference in a diameter of the primary drive gear 192 and a diameter of the first drive gear 194 and/or a diameter of the second drive gear 196. Alternatively, in some cases, the first drive gear 194 and/or the second drive gear 196 may be wheels instead of gears, and the primary drive gear 192 may include serrations that the wheels ride upon. In another example, the first drive gear 194 and the second drive gear 196 may be pulleys, and the primary drive pulley may drive the first and second drive pulleys via one or more belts. Using belts to drive the first drive pulley 194 and/or the second drive pulley 196 may enable, with the use of an adjustable tensioning device (not illustrated), to selectively engage or disengage the first drive shaft 188 and/or the second drive shaft 190, and thus selectively engage or disengage the corresponding electric generators driven by the first drive shaft 188 and/or the second drive shaft 190.

As illustrated, the frame 180 supports a first plurality 200 of electric generators that are disposed on either side of the first drive shaft 188 and a second plurality 202 of electric generators that are disposed on either side of the second drive shaft 190. Accordingly, each of the electric generators in the first plurality 200 of electric generators are driven into rotation by the first drive shaft 188 and each of the electric generators in the second plurality 202 of electric generators are driven into rotation by the second drive shaft 190. As illustrated, the primary drive shaft 184 is also splined, and there is a third plurality 204 of electric generators that are disposed on either side of the primary drive shaft 184.

In particular, the first plurality 200 of electric generators includes electric generators 200A, 200B, 200C and 200D on a first side of the first drive shaft 188 and electric generators 200E, 200F, 200G and 200H on a second side of the first drive shaft 188. Similarly, the second plurality 202 of electric generators includes electric generators 202A, 202B, 202C and 202D on a first side of the second drive shaft 190 and electric generators 202 E, 202F, 202G and 202H on a second side of the second drive shaft 190. The third plurality 204 of electric generators includes electric generators 204A, 204B, 204C and 204D on a first side of the primary drive shaft 184 and electric generators 204E, 204F, 204G and 204H on a second side of the primary drive shaft 184. While four electric generators are illustrated on each side of each of the drive shafts 184, 188, 190, it will be appreciated that in some cases, there may be only one, two or three electric generators, or there may be five, six or even more generators on each side of each of the drive shafts 184, 188, 190.

Each electric generator may be driven by a rotating shaft so that when the corresponding drive shaft is rotated, directly or indirectly by the wind-driven rotation device 10, each electric generator is turned as well. In some cases, each electric generator may be coupled to a rotating drive shaft through, for example: (1) a belt wrapped around the drive shaft and an exterior circumference of a pulley mounted to the input shaft of the electric generator; (2) a gear mounted to the input shaft of the electric generator that engages corresponding ridges or teeth formed in the drive shaft; (3) a friction fit between an exterior circumference of a wheel mounted to the input shaft of the electric generator and an outer circumferential surface of the rotatable shaft.

In some cases, as illustrated, each of the electric generators include a raised wheel portion 224 that stands above the rest of the electric generator, and is able to engage a corresponding drive shaft. In some cases, the raised wheel portion 224 is splined or otherwise configured to rotatably engage a splined surface on the corresponding drive shaft. In some instances, each of the electric generators may instead include a raised wheel such as the raised wheels 29 shown in FIG. 1.

In the illustrative embodiment, each row of electric generators are mounted so that the corresponding electric generators are collinear or are nearly collinear along a line that is parallel or is nearly parallel to the corresponding drive shaft. Here, the term "nearly" is intended to accommodate typical manufacturing and assembly tolerances. For instance, a replacement part may be sized differently, and may extend farther in a particular direction than the part it replaces. Or, a part may be fastened to a hole adjacent to the hole intended for its mounting. In all of these cases, the electric generators may be said to be collinear or nearly collinear.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A wind-driven charging assembly configured to be driven by a wind-driven rotation device having a rotor, the wind-driven charging assembly comprising:
   a plurality of parallel rotatable shafts that are rotated by the rotor of the wind-driven rotation device; and
   each of the plurality of rotatable shafts driving a plurality of electric generators that are arranged longitudinally along the corresponding rotatable shaft.

2. The wind-driven charging assembly of claim 1, wherein:
   each of the plurality of rotatable shafts has one or more serrated portions; and
   each of the plurality of electric generators have a wheel that is configured to ride along at least one of the one or more serrated portions of the corresponding rotatable shaft.

3. The wind-driven charging assembly of claim 1, wherein each of the plurality of rotatable shafts are rotated at the same rotation rate.

4. The wind-driven charging assembly of claim 1, wherein:
   for each of the plurality of rotatable shafts, some of the plurality of electric generators that are driven by that rotatable shaft are disposed along a first side of that rotatable shaft and some of the plurality of electric generators driven by that rotatable shaft are disposed along a second opposing side of that rotatable shaft.

5. The wind-driven charging assembly of claim 1, further comprising a controller, wherein the controller is configured to dynamically electrically engage and disengage at least some of the plurality of electric generators.

6. A wind-driven charging assembly configured to be driven by a wind-driven rotation device having a rotor, the wind-driven charging assembly comprising:
   a plurality of electric generators;
   a frame for mounting the plurality of electric generators in a two-dimensional array having an array size of "n" by "m", wherein "n" is greater than two and "m" is greater than two; and
   two or more drive shafts for driving the plurality of electric generators, the two or more drive shafts are configured to be rotated by the rotor of the wind-driven rotation device.

7. The wind-driven charging assembly of claim 6, wherein:
   each of the two or more drive shafts comprise one or more serrated portions; and each of the plurality of electric generators comprise a wheel that is configured to ride along at least one of the one or more serrated portions of one of the two or more drive shafts.

8. A wind-driven charging system, comprising:
a wind-driven rotation device having a rotor;
a primary shaft extending along a rotation axis;
a coupling for operatively coupling the rotor of the wind-driven rotation device to the primary shaft;
a first drive shaft operatively coupled to the primary shaft and rotated by power from the primary shaft;
a first plurality of electric generators each disposed at a different longitudinal location along the first drive shaft, each of the first plurality of electric generators rotationally driven simultaneously by the first drive shaft;
a second drive shaft operatively coupled to the primary shaft and rotated by power from the primary shaft; and
a second plurality of electric generators each disposed at a different longitudinal location along the second drive shaft, each of the second plurality of electric generators rotationally driven simultaneously by the second drive shaft.

9. The wind-driven charging system of claim 8, wherein:
the primary shaft includes a primary drive gear;
the first draft shaft includes a first drive gear that is driven by the primary drive gear;
the second draft shaft includes a second drive gear that is driven by the primary drive gear; and
wherein the primary drive gear is of different diameter than the first drive gear and the second drive gear.

10. The wind-driven charging system of claim 8, wherein the wind-driven rotation device rotates about an axis that is laterally offset from the rotation axis of the primary shaft.

11. The wind-driven charging system of claim 8, wherein the coupling that operatively couples the rotor of the wind-driven rotation device to the primary shaft comprises:
a first coupling gear mounted to the rotor of the wind-driven rotation device; and
a second coupling gear mounted to the primary shaft, wherein the first coupling gear drives the second coupling gear.

12. The wind-driven charging system of claim 8, wherein:
the first drive shaft includes one or more serrated portions; and
each of the first plurality of electric generators include a wheel that is configured to ride along at least one of the one or more serrated portions of the first drive shaft.

13. The wind-driven charging system of claim 12, wherein:
the second drive shaft includes one or more serrated portions; and
each of the second plurality of electric generators include a wheel that is configured to ride along at least one of the one or more serrated portions of the second drive shaft.

14. The wind-driven charging system of claim 8, wherein:
the primary shaft includes one or more serrated portions; and
the wind-driven charging system further comprises a third plurality of electric generators, wherein each of the third plurality of electric generators include a wheel that is configured to ride along at least one of the one or more serrated portions of the primary shaft.

15. The wind-driven charging system of claim 14, wherein:
some of the third plurality of electric generators are disposed along a first side of the primary shaft; and
some of the third plurality of electric generators are disposed along a second opposing side of the primary drive shaft.

16. The wind-driven charging system of claim 8, further comprising a controller in communication with the first plurality of electric generators.

17. The wind-driven charging system of claim 16, wherein the controller is configured to dynamically electrically engage and disengage at least some of the first plurality of electric generators.

18. The wind-driven charging system of claim 8, wherein:
some of the first plurality of electric generators are disposed along a first side of the first drive shaft; and
some of the first plurality of electric generators are disposed along a second opposing side of the first drive shaft.

19. The wind-driven charging system of claim 18, wherein:
some of the second plurality of electric generators are disposed along a first side of the second drive shaft; and
some of the second plurality of electric generators are disposed along a second opposing side of the second drive shaft.

20. The wind-driven charging system of claim 18, wherein the first drive shaft and the second drive shaft are coplanar with the primary shaft.

* * * * *